BARNARD & SPILLER.

Evaporating Pan.

No. 60,120.

Patented Dec. 4, 1866.

United States Patent Office.

IMPROVEMENT IN APPARATUS FOR THE MANUFACTURE OF "SALT BLOCK."

NEWELL BARNARD AND J. G. SPILLER, OF SAGINAW CITY, MICHIGAN.

Letters Patent No. 60,120, dated December 4, 1866.

SPECIFICATION.

TO ALL WHOM IT MAY CONCERN:

Be it known that we, NEWELL BARNARD and JOSEPH G. SPILLER, both of Saginaw City, Saginaw county, Michigan, have invented a new and useful Improvement in Salt Block; and we do hereby declare that the following is a full, clear, and exact description thereof, which will enable others skilled in the art to make and use the same, reference being had to the accompanying drawing, forming part of this specification, in which—

Similar letters of reference indicate like parts.

Figure 1:
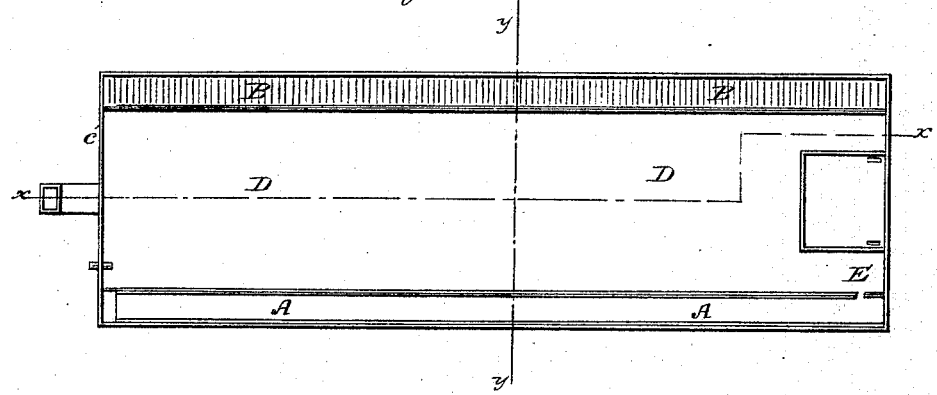
Figure 1 is a top or plan view of our improved salt block, one of the drying racks being removed.
Figure 2:
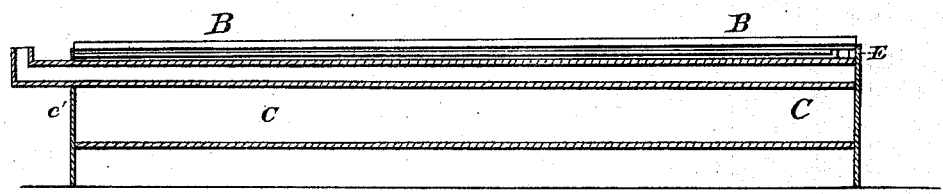
Figure 2 is a vertical longitudinal section of the same, taken through the line $x\ x$, fig. 1.
Figure 3:
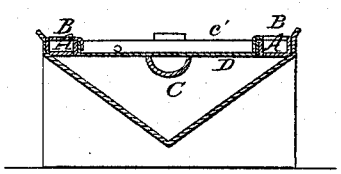
Figure 3 is a vertical cross-section of the same, taken through the line $y\ y$, fig. 1.

Our invention has for its object to furnish an improvement to the salt block known as Chapin's Patent Salt Block, by means of which some of the difficulties attending the use of that apparatus may be avoided. And it consists, first, in admitting the brine at the forward or hottest part of the pan; second, in drawing off the bitter water at the rear end of the block; third, in the combination, with the lower vat, with the block, and with the drying rack, of a trough, as hereinafter more fully described. In the use of salt blocks, two difficulties have been encountered: first, the formation of what is called bitter water, which begins to form at the forward or hottest part of the block, and gradually works back so as to cover about two-thirds of the surface of said block. This bitter water forms a thick, tough scum over the surface of the brine through which the steam cannot force its way. Consequently the evaporation could take place only in the rear part of the pan, rendering necessary the expenditure of a greater amount of fuel. This bitter water had to be drawn off at least once in twenty-four hours, causing a further waste of fuel, and also of the brine, as the brine would be nearly boiling hot, and it had to be thrown away. The brine and bitter water were drawn off at the front end of the block, that being the place where the bitter water collected. The second difficulty is the formation of salt in the lower vat. This is caused by the evaporation of the brine in the lower vat through the spaces under the drying racks. This salt could only be removed by letting the fires go down, and drawing off the brine in the lower vat, then letting on enough fresh water to dissolve the salt, and then drawing that off. Or else the block had to be broken up and the salt shovelled out. This salt is unfit for use, from the impurities contained in the brine having settled and become mixed with said salt. To remedy these difficulties, we fit a trough A closely into the space beneath the drying racks, B, leaving a narrow space at the rear end of the vat, between the rear end of the trough A and the end wall $c'$ of the vat $c$. Through this space we allow the brine to escape from the lower vat, instead of allowing it to pass up directly into the block D, through holes formed in the rear part of the bottom of the block D, as has heretofore been done. The brine then runs along the whole length of the trough A, and enters the block D at its forward or hottest end through notches or openings formed in the side walls of the said block, as seen at E, in figs. 1 and 2. By thus closing the spaces beneath the drying racks B, we stop the evaporation of the brine in the lower vat, and consequently the formation of salt therein. And by admitting the brine upon the block, at its forward end, the formation of bitter water is very greatly checked, only a little of it being formed, and that little at the rear end of the block, which we can draw off at the rear end of the block without wasting one-tenth as much brine as by the old method, when the bitter water was drawn off at the front end of the block.

We claim as new, and desire to secure by Letters Patent—

1. Admitting the brine at the forward end, or hottest part of the block D, substantially as described, and for the purpose set forth.

2. Drawing off the bitter water at the rear end of the block D, substantially as described, and for the purpose set forth.

3. The combination, with the lower vat $c$, with the block D, and with the drying rack B, of the trough A, substantially as described, and for the purpose set forth.

NEWELL BARNARD,
JOSEPH G. SPILLER.

Witnesses:
JOHN L. BARNARD,
JOSEPH M. BARNARD.